July 29, 1941.  A. KASSLER  2,250,535
COVERED CONVERTIBLE FREIGHT CAR
Filed Dec. 29, 1938   5 Sheets-Sheet 1

INVENTOR
Adolph Kassler
BY
Donald U. Rich
ATTORNEY

July 29, 1941.  A. KASSLER  2,250,535
COVERED CONVERTIBLE FREIGHT CAR
Filed Dec. 29, 1938  5 Sheets-Sheet 2

INVENTOR
Adolph Kassler
BY
ATTORNEY

July 29, 1941.  A. KASSLER  2,250,535
COVERED CONVERTIBLE FREIGHT CAR
Filed Dec. 29, 1938   5 Sheets-Sheet 4

INVENTOR
Adolph Kassler
BY
Donald U. Rich
ATTORNEY

July 29, 1941.  A. KASSLER  2,250,535
COVERED CONVERTIBLE FREIGHT CAR
Filed Dec. 29, 1938  5 Sheets-Sheet 5

INVENTOR
Adolph Kassler
BY
ATTORNEY

Patented July 29, 1941

2,250,535

UNITED STATES PATENT OFFICE 2,250,535

COVERED CONVERTIBLE FREIGHT CAR

Adolph Kassler, New York, N. Y., assignor to American Car and Foundry Company, New York, N. Y., a corporation of New Jersey Application December 29, 1938, Serial No. 248,168

10 Claims. (Cl. 105—377)

This invention relates to freight cars in general and in particular to freight cars having removable covers and convertible when desired to form cars of a different type. Freight cars in the past have generally been constructed to carry commodities of a certain general type with the result that railroads require large numbers of cars of each type constructed to meet present and calculated future traffic demands. However, instances arise wherein sudden demands are placed on the railroads for an increased number of cars of one type, which demand may be of short duration not warranting the enormous expense of supplying new cars. It is an object, therefore, of the present invention to provide a freight car of one type which may be readily converted when desired into a car of another type with a minimum of structural change.

A further object of the invention is the provision of a gondola car having a removable roof and with the body so constructed as to permit unloading of its contents by means of a grab bucket or similar device.

A still further object of the invention is the provision of a gondola car which may be used either as a gondola, as a covered gondola or as a regulation box car.

Yet another object of the invention is the provision of a gondola car having an improved bracing connection between the side stakes and car underframe.

These and other objects of the invention will be apparent to persons skilled in the art from a study of the following description and accompanying drawings, in which:

Fig. 6 is a sectional view of the side of the car when converted for use as a box car, and Fig. 7 is a sectional view through the door opening of Fig. 6.

Figure 1:
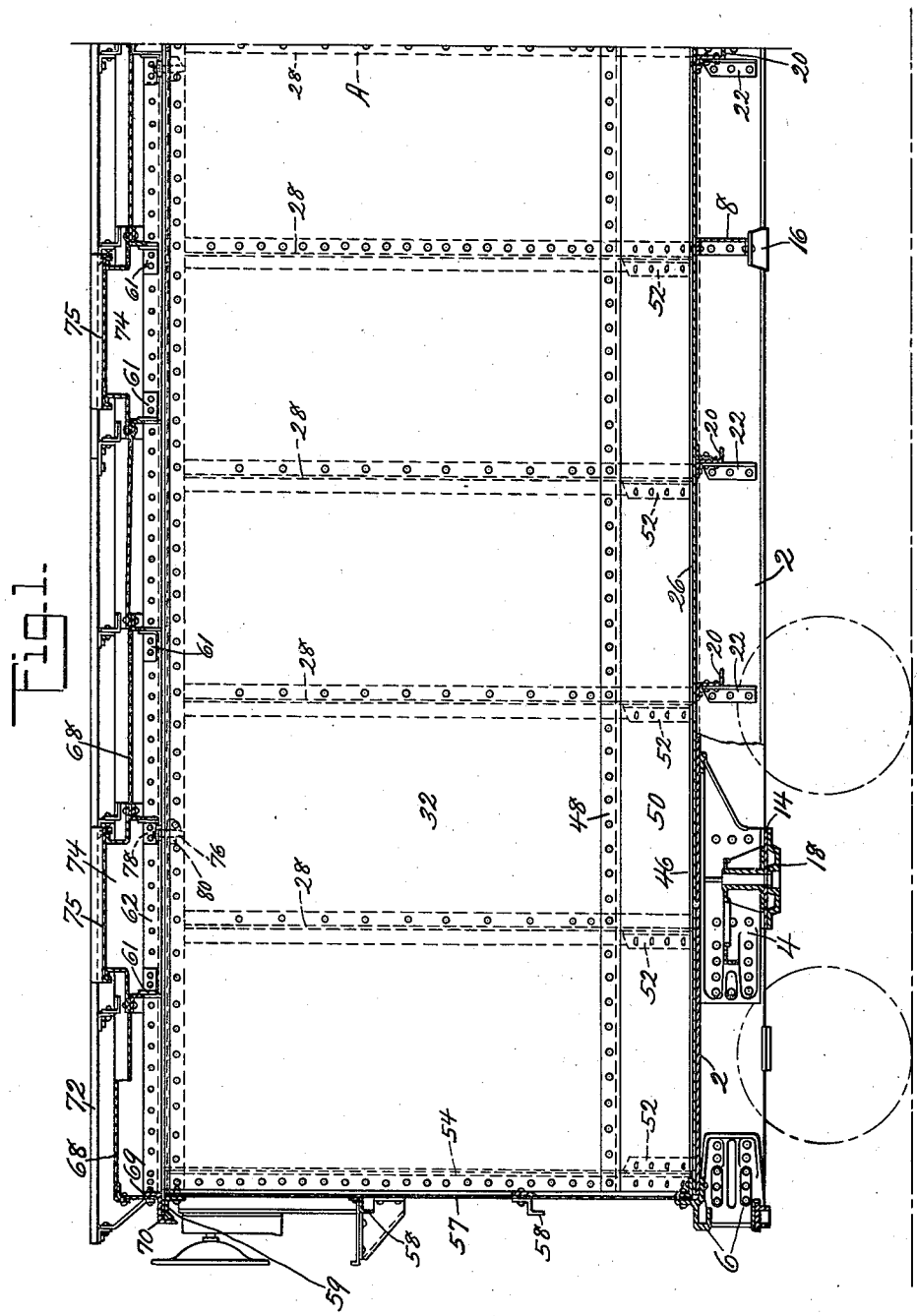
Fig. 1 is a sectional view showing substantially one-half of the car.
Figure 2:
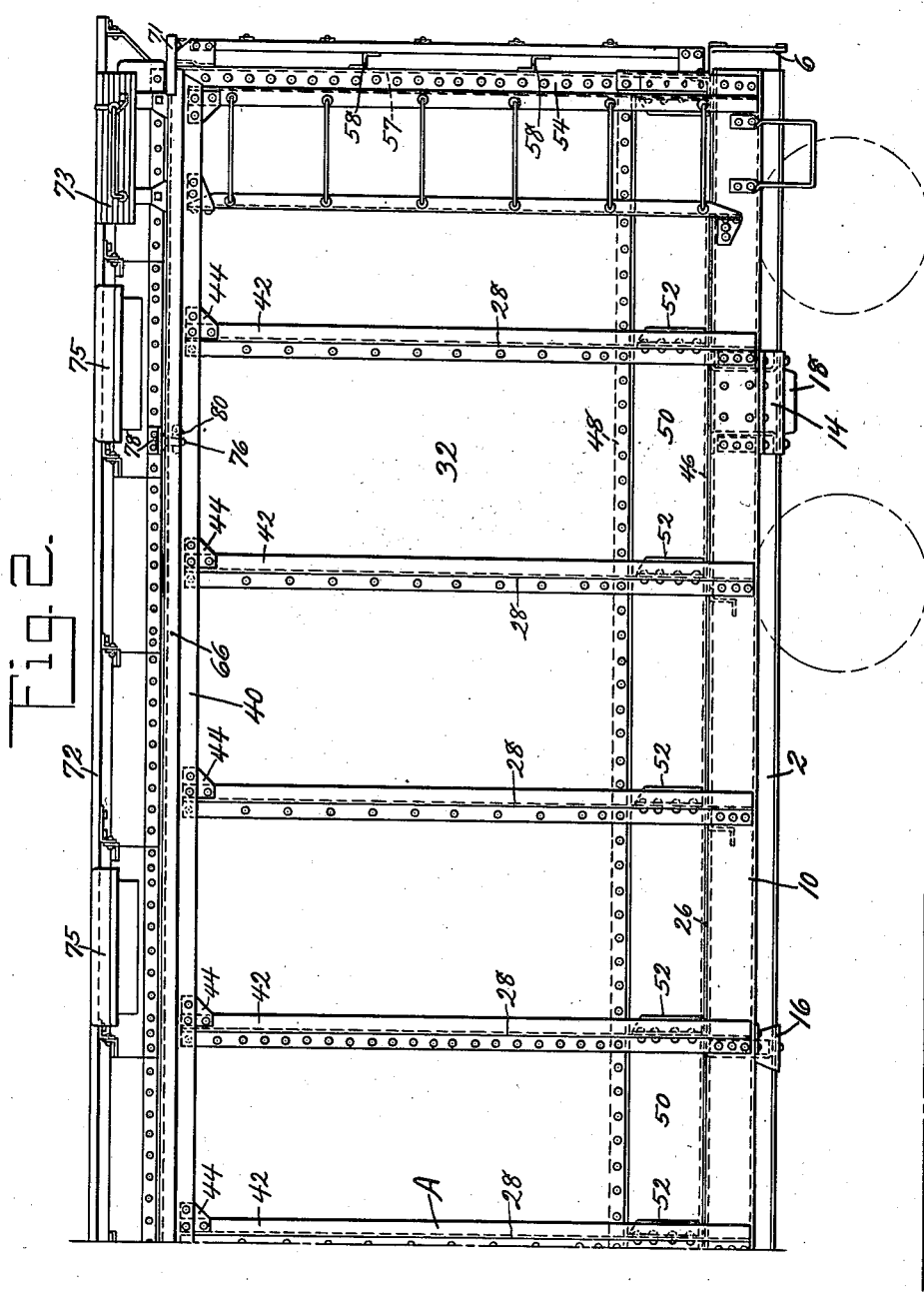
Fig. 2 is an elevational view showing the other half of the car.
Figure 3:
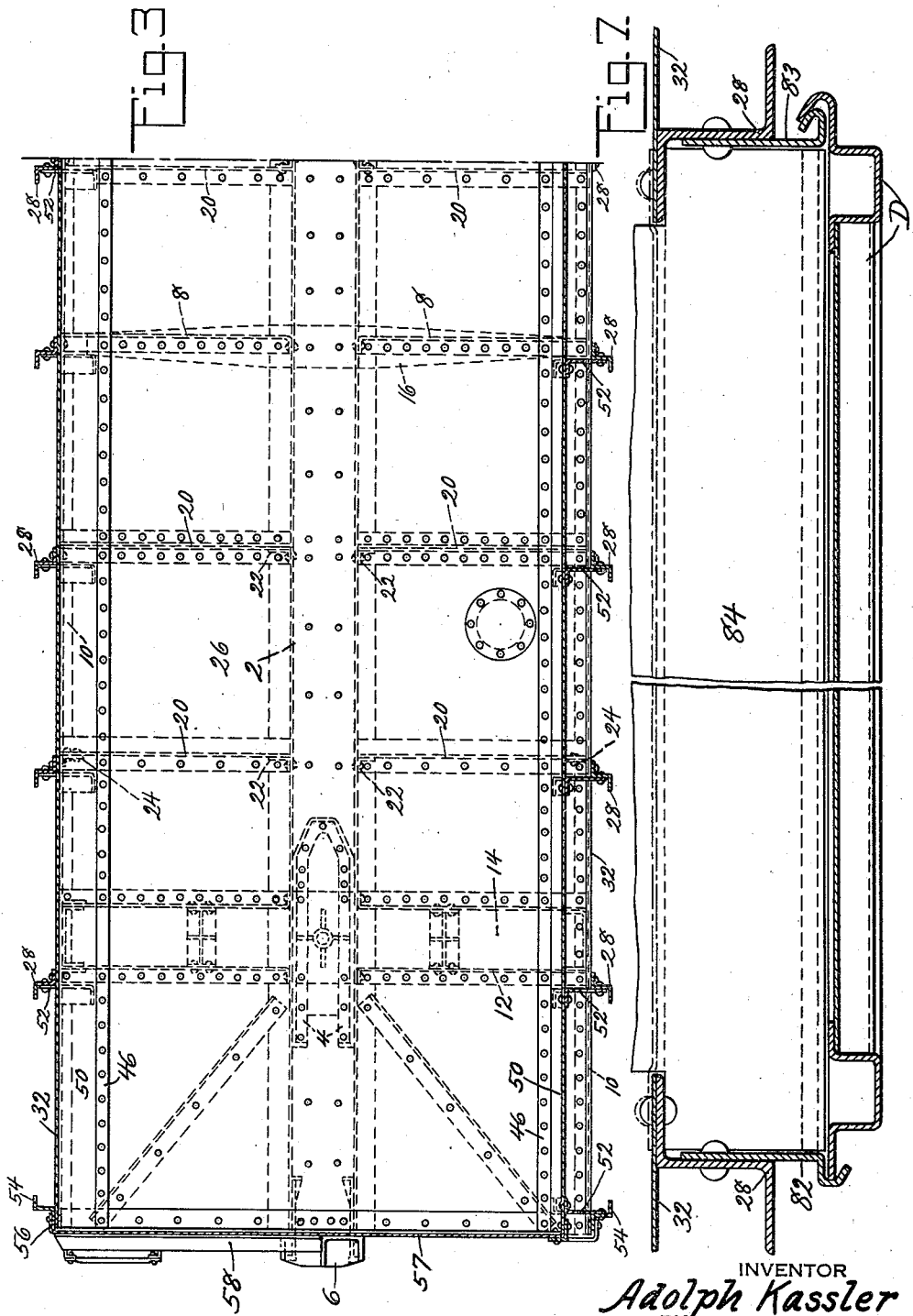
Fig. 3 is a horizontal sectional view of the half car shown in Fig. 1.
Figure 4:
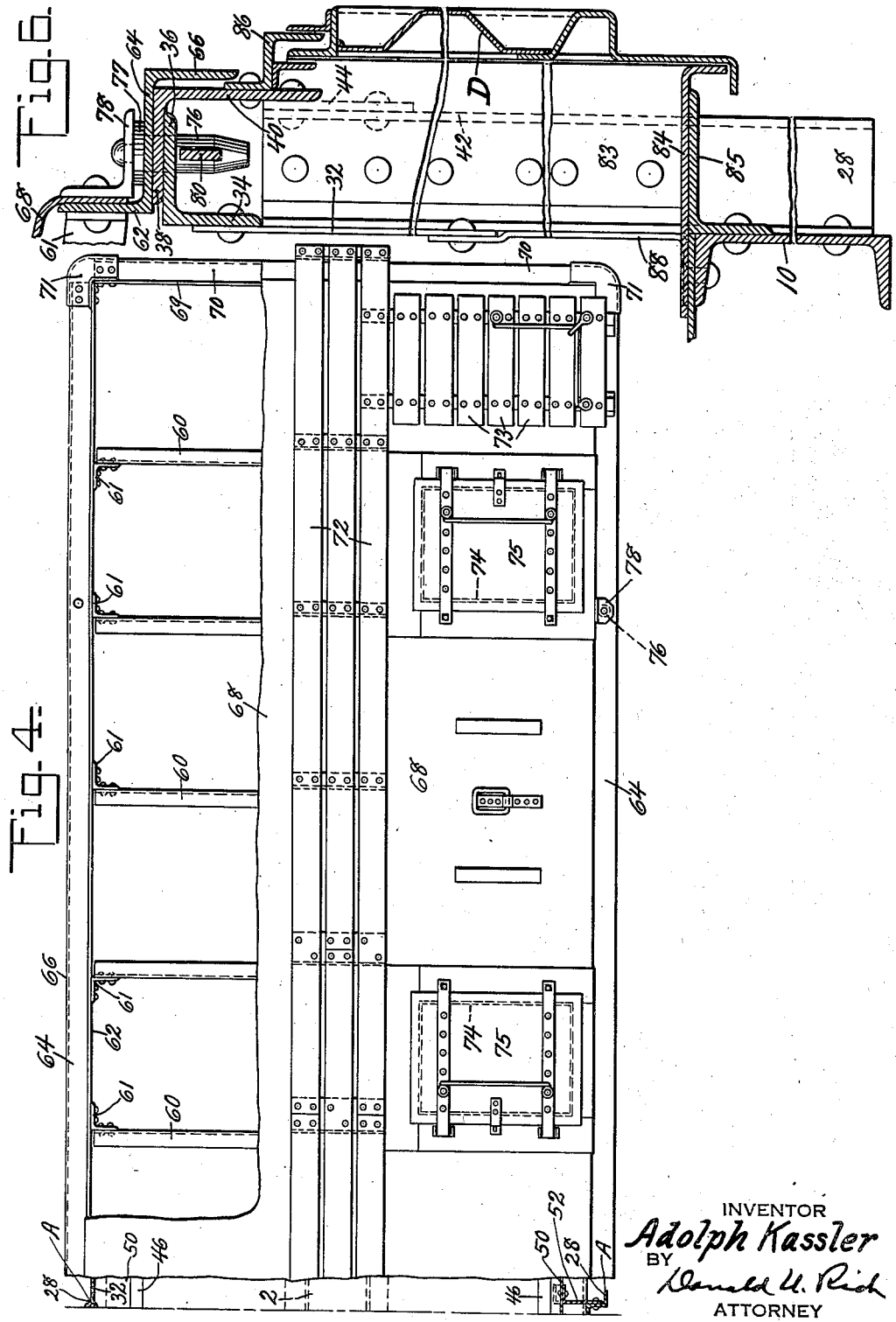
Fig. 4 is a plan view of the half car shown in Fig. 2 but with portions of the roof sheet broken away to more clearly disclose the construction.

Referring now to the drawings in detail, it will be seen that the car is provided with an underframe having flanged channel center sills 2 interiorly braced and connected by combined bolster center filler and rear back stop 4 and also by striker casting and front stop 6. Cross bearers 8 of channel formation are connected to the sides of the center sill and extend outwardly for connection to channel side sills 10, which side sills are also connected to the center sill by bolsters 12 formed by channel shaped pressings. The bolster members and cross bearer members on either side of the center sill are connected together by means of bottom cover plates 14 and 16 respectively. The customary center bearing 18 is attached to the bolster cover plate and is adapted to cooperate with conventional truck bolster (not shown) in order to support the car body on the truck. Cross ties 20 of Z-bar form are positioned between the bolsters and adjacent cross bearers and also between the cross bearers and are connected to the center sill and side sills by means of angle clips 22 and 24 respectively. Floor sheet 26 is mounted upon and connected to the side sills, cross bearers, cross ties and center sill, thus forming a rigid underframe unit.

Figure 5:
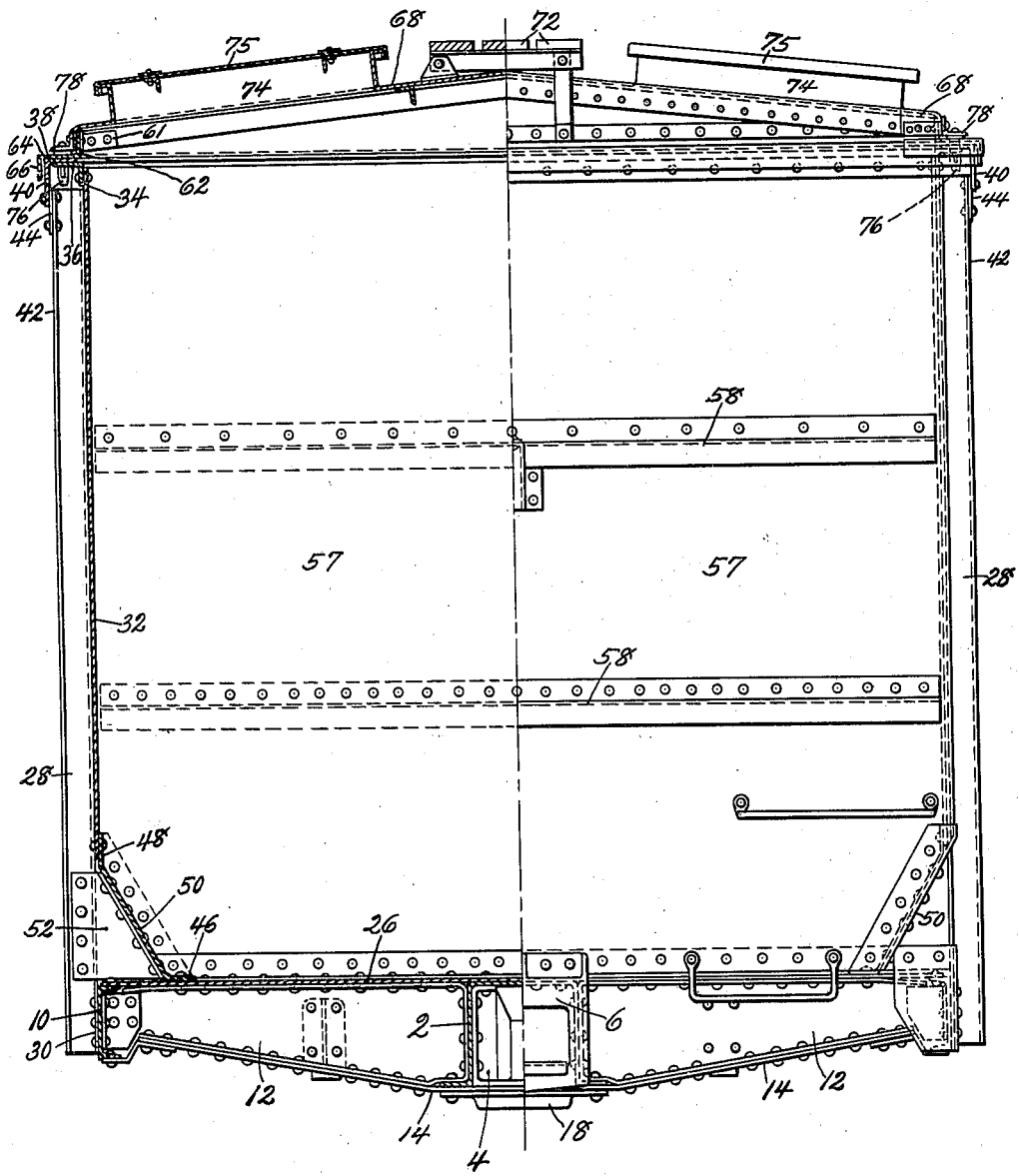
Fig. 5 is an end view of the car one-half, however, being shown in section to more clearly disclose the car construction.

The side walls are constructed with Z-bar side stakes 28 having the web positioned at right angles to the side wall and the inner flange 30 connected at the bottom to the web of the side sill and to the side wall plate 32. The side wall plate extends upwardly above the tops of the side stakes for attachment to the vertical leg 34 of an angle member having its horizontal leg 36 directed outwardly for direct connection with the horizontal leg 38 of an outer angle member. This outer angle member has its vertical leg 40 directed downwardly and connected to the outer flange 42 of the Z-bar stakes by means of gussets 44. In this manner a strong top chord of substantially inverted channel form is provided attached to the side sheet and capping the upper ends of the side stakes. Since the car is constructed and intended for unloading by means of a grab bucket or similar device, it is impossible to provide cross ties between the side walls. Therefore, in order to suitably brace the side wall construction it was found necessary to provide corner pieces of distorted channel section extending from end to end of the car and having one flange 46 connected to the floor sheet, while the other flange 48 is connected to the lower end of the side wall and to the side stakes with the web 50 positioned at an angle to the floor and side wall. The corner pieces are connected to each stake by means of stake braces 52 which are riveted, or otherwise attached, to the corner piece and to the web of the side stake, as clearly shown in Fig. 5. It will thus be seen that the corner pieces, together with the stake braces, form an extremely strong connection preventing any deformation of the side wall from the true vertical position, while at the same time providing an excellent corner permitting more nearly complete discharge of the car contents by the unloading device. The corner posts 54 are also of Z formation braced in the same manner as the side stakes and have the inner or wall contacting flange overlapped by flange 56 of end wall plate 57, which plate may be either corrugated or plain as shown and reinforced by suitable stiffeners, such as Z-bars 58. The upper edge of each end plate is reinforced by means of bulb angle 59 having the web thereof directed outwardly in a plane substantially parallel to the plane of angle flange 38 previously referred to. By this arrangement a ledge is provided extending continuously along the sides and end of the car, which ledge is used to reinforce the car and to provide a support for a removable roof now to be described.

The roof is formed by carlines 60 connected at their ends by angle clips 61 to vertically directed flange 62 of Z-bar member having its web 64 directed outwardly and adapted to rest on the flange 38, of the top side wall angle member. The outer flange 66 of this Z-bar member is directed downwardly in overlapping spaced relationship to the vertical leg 40 of the side wall top chord and acts as a positioning and guiding element by means of which the roof may be guided to its final position on the car. Roof sheet 68 is supported by and connected to the carlines and flange 62 of the Z-bar members and also to flange 69 of an end Z-bar member 70 connected to the side Z-bar members by means of corner connections 71. The roof is provided with the customary longitudinal running boards 72, latitudinal running boards 73 and any desired number or style of hatch openings 74 adapted to be closed by doors 75. In order that the roof may be locked in position upon the car a plurality of locking means are provided and in the present instance these consist of pins 76 having a tapered lower end for guiding purposes and an upper enlarged portion 77 adapted to be positioned between the web of the Z-bar member and an angle clip 78 to which it is attached and which is connected to the roof sheet and upwardly directed flange of the member preferably at a carline end. Thus it will be seen that the pins are carried by the roof and are adapted to project through holes in the top chord of the car, after which locking bars 80 may be inserted preventing accidental removal of the roof.

It will thus be seen that an extremely strong car of the gondola type has been provided with the side walls braced by corner pieces preventing distortion of the side walls and that each side wall is provided at its upper edge with a top chord construction adapted to support a member of the roof construction to which it may be locked. In other words, the top chord and roof carried Z member may be considered as forming a side plate, with the roof carried Z-bar forming a part and the top chord forming the other part. Thus the Z-bar member may be properly termed a roof carried side plate and the chord a side wall carried side plate. When the car is being used as an open gondola or is being unloaded, then the side stakes must resist the bulging tendency of the load and the side wall carried side plate will act only as a top chord, but if the car has the roof attached, then the roof structure helps resist the bulging tendency and the side wall carried side plate cooperates with the roof carried side plate to form a true side plate for the car.

In constructing the gondola car certain of the side stakes, preferably those at the center, are so spaced that by removal of one, such as A, together with the side sheet on either side thereof, an opening is provided for accommodation of a side door D (Figs. 6 and 7). With the side sheets removed the door opening is provided with a front sealing means 82, rear sealing means 83 and threshold plate 84 secured to the floor and to the side sill by means of a reinforcing angle 85. Sealing means 86 of conventional form may be attached to the downwardly directed flange 40 of the side wall angle, thus effectively sealing the upper edge of the door. If it is desired to more or less permanently change the gondola to a box car, then the corner members and stake braces 52 are removed, after which either a new plate or the old corner members may be reworked to provide a connecting plate 88 joining the lower edge of the side wall sheet and the floor plate as clearly shown in Fig. 6. The roof may be left removable, if desired, or it may be rigidly attached to the side walls by riveting the roof carried side plate directly to the side wall carried side plate, thus giving a complete box car of more or less conventional design without any excessive or expensive modifications.

It will be seen from the preceding description that a car constructed in accordance with the present invention may be used either as a covered gondola for transport of commodities which must be kept dry, or as an open gondola for the transport of ores or similar commodities which do not necessarily need to be protected from the elements or from theft. It will also be seen that if the demand for shipment of commodities that may be transported in open or covered gondolas should diminish, then the owner of the car could readily transfer the same from such service to box car service by modifying slightly the car construction; also if the car has been converted from a gondola to a box car it may be readily and economically changed back to gondola service with a minimum outlay for materials or labor.

While the car has been described more or less in detail, it is obvious that various modifications and rearrangements of parts will be possible and all such modifications and rearrangements of parts are contemplated as come within the scope of the following claims.

What is claimed is:

1. In a railway gondola car the combination of a metal underframe including cross members and side sills, a floor attached to said cross members and side sills, side posts attached to said side sills and positioned substantially at right angles thereto, side wall sheets attached to said side posts and having the lower edges thereof terminating in spaced relation to said floor, bracing means connecting said lower edges of said side wall sheets to said floor inwardly of the side sills, and additional transversely extending braces connecting said first named bracing means to said posts, said first named bracing means extending from end to end of the car thereby closing the space between said lower edges of the side wall sheets and floor and acting in conjunction with said additional bracing means to maintain the side walls substantially in right angular relation to said underframe.

2. In a railway freight car the combination of a metal underframe including cross members and side sills connected together, a floor attached to said cross members and side sills, side posts attached to said side sills and positioned substantially at right angles thereto, side wall sheets attached to said side posts and having their lower edges spaced upwardly from said floor, bracing means extending from end to end of the car and connecting said lower edges of the side wall sheets to the floor at points spaced inwardly from the side edges thereof, transversely extending stiffener elements connecting each side post and said bracing means, said bracing means acting to maintain the side walls substantially at right angles to said underframe whereby the car interior may be devoid of additional bracing thereby permitting unloading of the car by mechanical means.

3. In a covered freight car the combination of a metal underframe including cross members and side sills connected together, a floor attached to said cross members and side sills, side posts attached to said side sills and positioned substantially at right angles thereto, side wall sheets attached to said side posts, bracing means extending from end to end of the car and connecting said side walls and floor adjacent the side sills, gussets connecting together said bracing means and lower portion of the side posts, top chords connected to said side sheets and side posts, and a removable roof detachably connected to said top chords, said gussets and bracing means cooperating with the posts to prevent distortion of the side walls when said roof is removed.

4. In a covered freight car the combination of a metal underframe including cross members and side sills connected together, a floor attached to said cross members and side sills, side posts attached to said side sills and positioned substantially at right angles thereto, side wall sheets attached to said side posts, bracing means having at least portions thereof extending from end to end of the car and connecting said side walls and floor adjacent the side sills, said bracing means acting to maintain said side walls substantially at right angles to said underframe, top chords connected to said side sheets and overlapping the side posts and secured thereto, and a removable roof detachably connected to said top chords, said roof having side members overlapping said top chords and cooperating with said bracing means to maintain the side walls substantially at right angles to the underframe when the roof is in position on said top chords.

5. In a covered convertible freight car the combination of a metal underframe including cross members and side sills connected together, a floor attached to said cross members and side sills, side posts attached to said side sills, side wall sheets attached to said side posts, corner pieces forming bracing means extending from end to end of the car and connecting said side walls and floor adjacent the side sills and inward of the floor edge, top chords connected to said side sheets and side posts, and a removable roof detachably connected to said top chords, said side posts being spaced in order to permit ready conversion of the car to a box car having standard size side doors and a fixed roof.

6. In a covered convertible freight car the combination of a metal underframe including cross members and side sills connected together, a floor attached to said cross members and side sills, side posts attached to said side sills, side wall sheets attached to said side posts, corner pieces extending from end to end of the car and connecting said side walls and floor adjacent the side sills, top chords connected to said side sheets and side posts, and a removable roof detachably connected to said top chords, said side posts being so spaced as to permit ready conversion of the car to a box car having side doors and a fixed roof, said conversion being accomplished by removal of said corner pieces, removal of certain of said side posts and adjacent side sheets and the substitution of side doors, and by attachment of said roof to said top chords.

7. In a railway freight car the combination of a car body including side posts and side sheets supported on an underframe, downwardly facing channel form top chords secured to said side sheets and overlapping and secured thereto, a car roof unit comprising in part Z bar side plates attached to the roof with the web substantially horizontal and the outer flange directed downwardly, said web being adapted to rest upon and be secured to said top chords with said outer flange overlapping the top chords in close proximity thereto thereby preventing side shifting of the roof or bulging of the car sides, and means locking said web and top chord together, said means consisting in part of pins carried by said Z bar side plates and projecting through the web and protected by the flanges of said channel form top chord.

8. In a covered convertible freight car the combination of a metal underframe including cross members and side sills connected together, a floor attached to said cross members and side sills, side posts attached to said side sills, side wall sheets attached to said side posts, bracing means extending from end to end of the car and connecting said side walls and floor adjacent the side sills, top chords connected to said side sheets and side posts, and a removable roof detachably connected to said top chords, said side posts being so spaced as to permit ready conversion of the car to a box car having side doors and a fixed roof, said converted car comprising the original underframe, side posts, side sheets and roof, and a connecting plate substituted for said bracing means and joining the lower edges of said side sheets to said side sills and outer edge of the floor except between the side stakes defining said door.

9. In a covered convertible freight car the combination of a metal underframe including cross members and side sills connected together, a floor extending from side sill to side sill and attached thereto and to said cross members, side posts attached to said side sills, side wall sheets attached to said side posts and terminating in upwardly spaced relationship to said floor, bracing means extending from end to end of the car and connecting the lower edges of said side wall sheets and floor inwardly of the side edges thereof, top chords connected to said side sheets and side posts and a removable roof detachably connected to said top chords, certain of said side posts being spaced to permit ready conversion of the car into a box car having side doors and a fixed roof, said converted car comprising the original underframe, roof, a majority of said side posts and side sheets, and a connecting plate forming a vertical continuation of the side wall substituted for said bracing means and joining the lower edges of said side sheets to said side sill and the outer edge of the floor.

10. In a convertible freight car the combination of a metal underframe including cross members and side sills, a floor attached to said cross members and side sills, side walls including side posts attached to said side sills and positioned at substantially right angles thereto, side wall sheets attached to the side posts and having the lower edge thereof in spaced relation to the floor, top chords connecting the side sheets and side posts and including roof supporting portions, a roof having downwardly extending portions overlapping said top chords to prevent said roof from shifting and the side walls from distortion when said roof is in position, corner pieces connecting the bottoms of said side sheets and said floor inward of the side wall to form substantially continuous diagonal braces for said side walls when said roof is removed, said corner pieces being adapted to be removed when said roof is in position and said side walls are thereby braced, and means to be substituted for said corner pieces and connecting said side walls and floor in substantially continuous contact with the lower portion of said stakes to complete said side wall structure.

ADOLPH KASSLER.